United States Patent
Lo et al.

(10) Patent No.: US 8,587,649 B2
(45) Date of Patent: Nov. 19, 2013

(54) LANE DEPARTURE WARNING SYSTEM

(75) Inventors: Chih-Wei Lo, Jhonghe (TW); Shih-Ho Lin, Jhonghe (TW); Hui-Chen Wei, Jhonghe (TW)

(73) Assignee: Create Electronic Optical Co., Ltd., Jhonghe, Taipei Country (TW)

( * ) Notice: Subject to any disclaimer, the term of this patent is extended or adjusted under 35 U.S.C. 154(b) by 678 days.

(21) Appl. No.: 12/427,248

(22) Filed: Apr. 21, 2009

(65) Prior Publication Data

US 2010/0265325 A1    Oct. 21, 2010

(51) Int. Cl.
*G03B 13/00* (2006.01)

(52) U.S. Cl.
USPC ............................. 348/119; 340/903; 701/301

(58) Field of Classification Search
USPC .......... 348/119, 113–116; 340/435, 438, 441, 340/459, 461, 463; 701/1, 116, 300
See application file for complete search history.

(56) References Cited

U.S. PATENT DOCUMENTS

| | | | | |
|---|---|---|---|---|
| 7,447,592 | B2 * | 11/2008 | Yopp et al. | 701/301 |
| 7,719,431 | B2 * | 5/2010 | Bolourchi | 340/576 |
| 2006/0125919 | A1 * | 6/2006 | Camilleri et al. | 348/148 |
| 2007/0257815 | A1 * | 11/2007 | Gunderson et al. | 340/903 |
| 2008/0077882 | A1 * | 3/2008 | Kramer et al. | 715/810 |
| 2009/0086565 | A1 * | 4/2009 | Ba et al. | 365/233.1 |
| 2009/0243824 | A1 * | 10/2009 | Peterson et al. | 340/435 |
| 2009/0284360 | A1 * | 11/2009 | Litkouhi | 340/439 |
| 2010/0063649 | A1 * | 3/2010 | Wu et al. | 701/1 |
| 2010/0148948 | A1 * | 6/2010 | Murphy et al. | 340/435 |
| 2010/0152951 | A1 * | 6/2010 | Chin et al. | 701/29 |

* cited by examiner

*Primary Examiner* — Patrice Winder
*Assistant Examiner* — Eyob Hagos
(74) *Attorney, Agent, or Firm* — Muncy, Geissler, Olds & Lowe, PLLC

(57) ABSTRACT

A lane departure warning system (LDWS) installed on vehicles is revealed. The LDWS includes a camera that captures road images and the data of images is sent to an electronic control unit (ECU) for processing and recognition. The ECU is directly connected with a global positioning system (GPS) that provides vehicle speed signals so as to check whether dangerous driving occurs. Once the dangerous driving occurs, a warning unit is turned on to send an alert. The conventional LDWS that complicatedly connects with vehicles parts such as turn signal lights or speedometers is replaced by connection with a GPS. Thus the convenience of installation of LDWS in vehicles is improved.

11 Claims, 7 Drawing Sheets

LANE DEPARTURE WARNING SYSTEM

BACKGROUND OF THE INVENTION

The present invention relates to a lane departure warning system (LDWS), especially to a lane departure warning system that connects with a global positioning system (GPS) for receiving vehicle speed signals so as to achieve the warning effect while vehicles departing the lane.

As a popular transportation tool, cars are equipped with various electronics such as global positioning systems (GPS), lane departure warning systems (LDWS), or event data recorder (EDR) according to users' needs. The global positioning system (GPS) is a mature product in the market. In combination with a GPS receiver that receives information from GPS satellite to calculate users' own position in real time. Together with a preset electronic map and a display screen, users can know their positions, areas, directions and vehicle speed, accurately locate where they are and easily navigate to where they want to go.

A conventional LDWS mainly includes a camera disposed in vehicles and facing forward to track road images in front the vehicle. For example, while on freeways, images of white lines on two sides of vehicle lanes are captured and input into an electronic control unit (ECU) of LDWS. The ECU consists of a digital signal processor (DSP) and a memory unit such as random access memory (RAM) for dealing with images recognition. The ECU further connects with turn signal lights or speedometers in vehicles so as to obtain vehicle signals for checking whether the dangerous driving occurs. For example, when a car runs at the speed of 60 Km/hr on a highway and the driver haven't turn on turn signal lights (for the lane change), the LDWS gives an alarm by sending signals to initiate a warning unit such as an audible warning unit and/or visual warning unit so as to alert (warn) the driver once the driver departs his lane without signaling.

Until now the ECU of the conventional LDWS still connects to the steering wheel, turn signal lights or speedometers so as to get vehicle (body) signals such as turn signals or vehicle speed. Together with images of the white line between the lanes, the LDWS detects whether is moving out of the lane and gives (or not give) a warning. However, the installation of LDWS affects circuits and equipments in vehicles and causes changes of the equipments or interior design of vehicles. There are various brands and models of cars. Moreover, each car is fitted with different equipments. Thus the installation of LDWS is more troublesome and difficult. People are not willing to change the equipments of interior design of the vehicle for installation of electronic devices so that the willingness to set the LDWS is lowered. This reduces the prevalence of the LDWS. Furthermore, the space inside the vehicle is limited. Yet most of cars are equipped with GPS. The GPS and the LDWS need to be installed respectively and this is inconvenient for users. Moreover, the GPS and the LDWS are independent from each other and unable to be integrated so that the cost of equipments and installation is increased.

SUMMARY OF THE INVENTION

Therefore it is a primary object of the present invention to provide a lane departure warning system (LDWS) that includes a camera, an electronic control unit (ECU) and a warning unit. The ECU is connected with a global positioning system (GPS). In use, the camera keeps track of road images such as lines of the lane and sends data to the ECU. Then by the global positioning system (GPS), a vehicle-speed signal is obtained. Using the vehicle speed signal in combination with road images, whether a dangerous driving happens is checked and an alarm is given. The complicated connection between vehicle signals such as turn signal lights and LDWS is replaced by the connection with the GPS for getting vehicle speed signals. This improves convenience and easiness of installation of LDWS in vehicles and increases prevalence of LDSW.

It is another object of the present invention to provide a lane departure warning system (LDWS) that is packed into a cover and forming an integrated part to be installed on certain positions in vehicles. The camera is optional. It can be integrated with the LDWS or to be independent and connected with the LDWS by wires. And the LDWS is disposed with a port for connection with camera wires. And the design of LDWS of the present invention can be modified according to requirements of manufacturing, assembling or installation.

It is a further object of the present invention to provide a lane departure warning system (LDWS) in which a global positioning system (GPS) is optional. The GPS can be integrated with the LDWS or to be independent and connected with the LDWS by wires. The LDWS is disposed with a port for connection with GPS wires. And the design of LDWS of the present invention can be modified according to requirements of manufacturing, assembling or installation.

It is a further object of the present invention to provide a lane departure warning system(LDWS) that is disposed with a display such as liquid crystal display panel (LCD panel) for showing road images such as lane images captured by the camera. While being installed, the shot-direction of the camera can be adjusted to optimal position by the display so as to get best view of the road images. Moreover, the installation of the LDWS is more convenient and easier.

DETAILED DESCRIPTION OF THE PREFERRED EMBODIMENT

Figure 1:
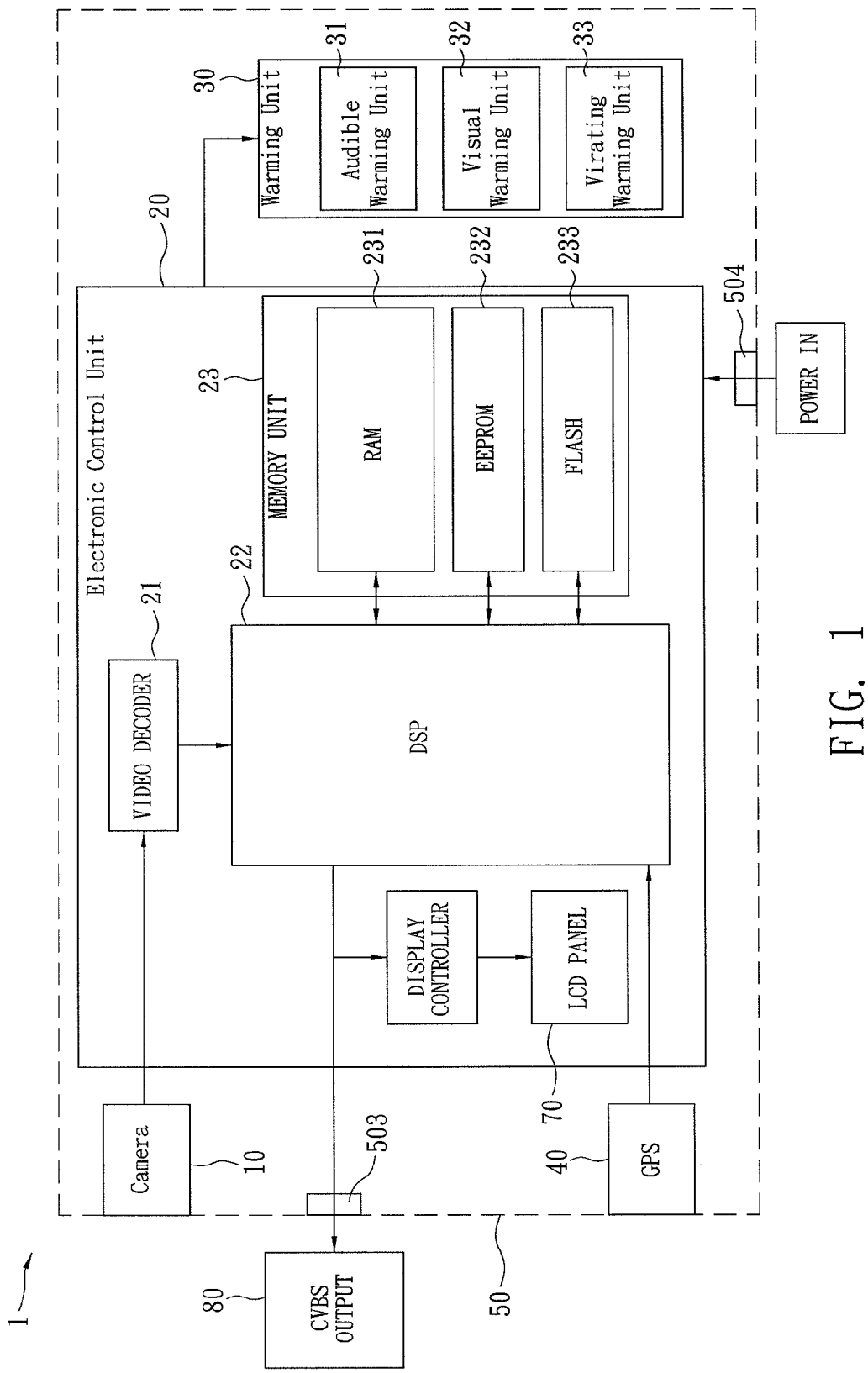
FIG. 1 is a circuit diagram of an embodiment integrated with a DSP according to the present invention.

Refer to FIG. 1, a lane departure warning system (LDWS) 1 installed on vehicles according to the present invention includes a camera 10, an electronic control unit (ECU) 20, and at least one warning unit 30. The ECU 20 is further connected with a global positioning system (GPS) 40 so as to get vehicle speed signals of the car whenever the LDSW requires. In use, the camera 10 is used to track road images such as images of lane lines on freeways and send data of images to the ECU 20 for dealing with and recognizing images. The ECU 20 further obtains a vehicle-speed signal at that time by the connected GPS 40. Together with road images, the ECU 20 checks whether a dangerous driving happens. For example, when a car runs at the speed of 60 Km/hr or above on a highway, now the vehicle speed signal of 60 Km/hr is obtained by the GPS 40 and is input into the ECU 20 to be used as a criterion of (for) the LDWS 1 to send an alert. That means the LDWS 1 is preset to turn on the warning function of the system when the car arrives certain speed. This preset function is achieved by the ECU 20 so the details are not described here. While driving, when it is found that the driver departs the lane or drive on zig zag lines along the road by recognition of the road images taken from the camera 10 of the LDWS 1. This means the dangerous driving is defined as that the driver is not driving between the lines on two sides of the lane. Then the ECU 20 sends signals to the warning unit 30 such as an audible warning unit 31, and/or a visual warning unit 32 and/or vibrating warning unit 33 so as to send warning signals to alert the driver and achieve the effects of LDWS.

The present invention features on that the LDWS 1 of the present invention gets vehicle speed signals by a GPS 40 so as to avoid inconvenience of conventional LDSW devices that connect with certain parts of vehicles for getting the vehicle signals. For example, the conventional LDSW is connected to the steering wheel, turn signal lights or the speedometer by wires so as to get vehicle signals such as turn signals or vehicle speed. Thus the present invention dramatically simplified the installation of the LDWS for preventing complicated procedures of installation. Therefore, consumer acceptance is improved due to easy installation of the LDWS. The LDWS is more prevalent and safer driving is achieved, especially driving on the highway.

Figure 4:
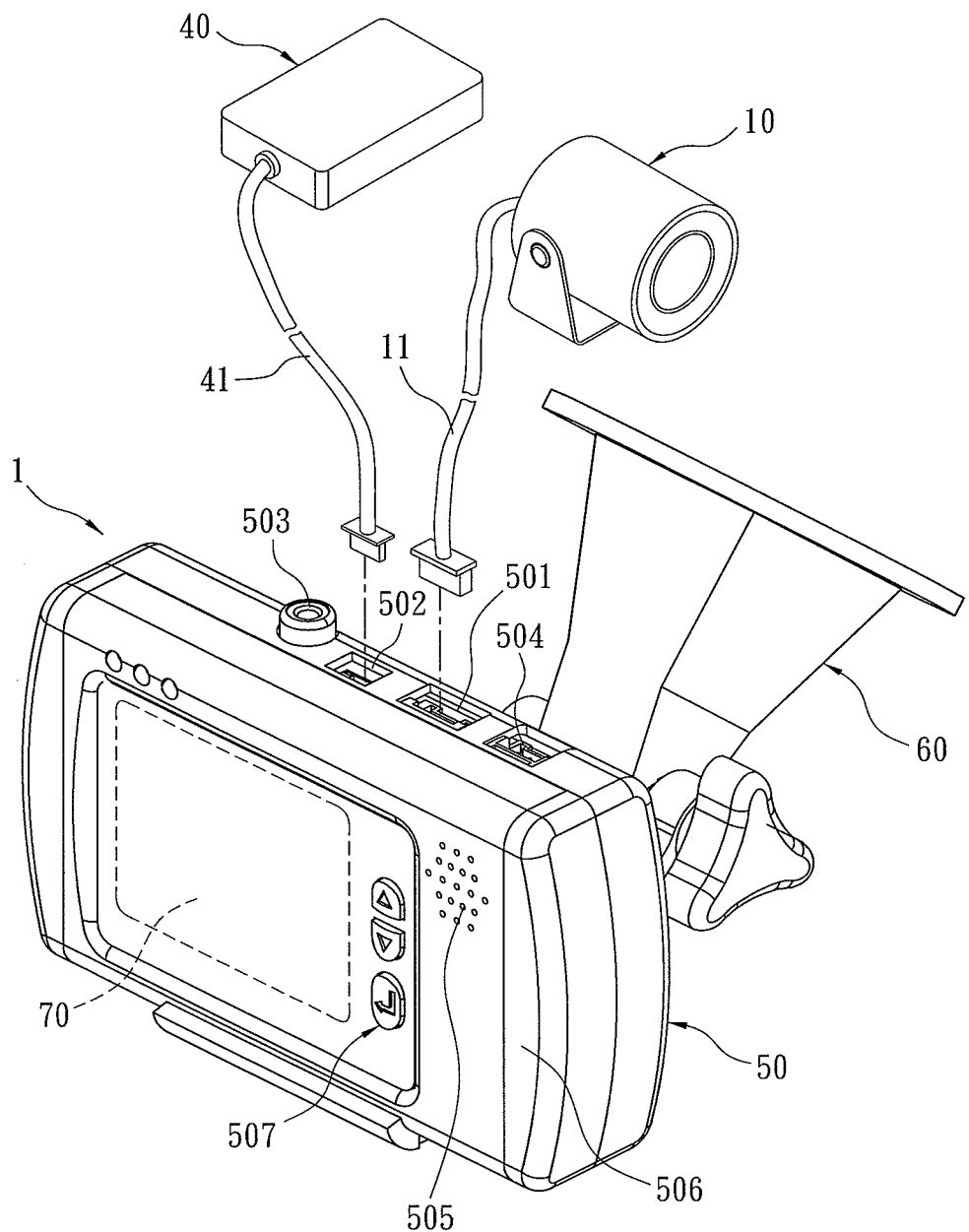
FIG. 4 is a perspective view of an embodiment having an external camera and an external GPS and assembled with a bracket according to the present invention.
Figure 5:
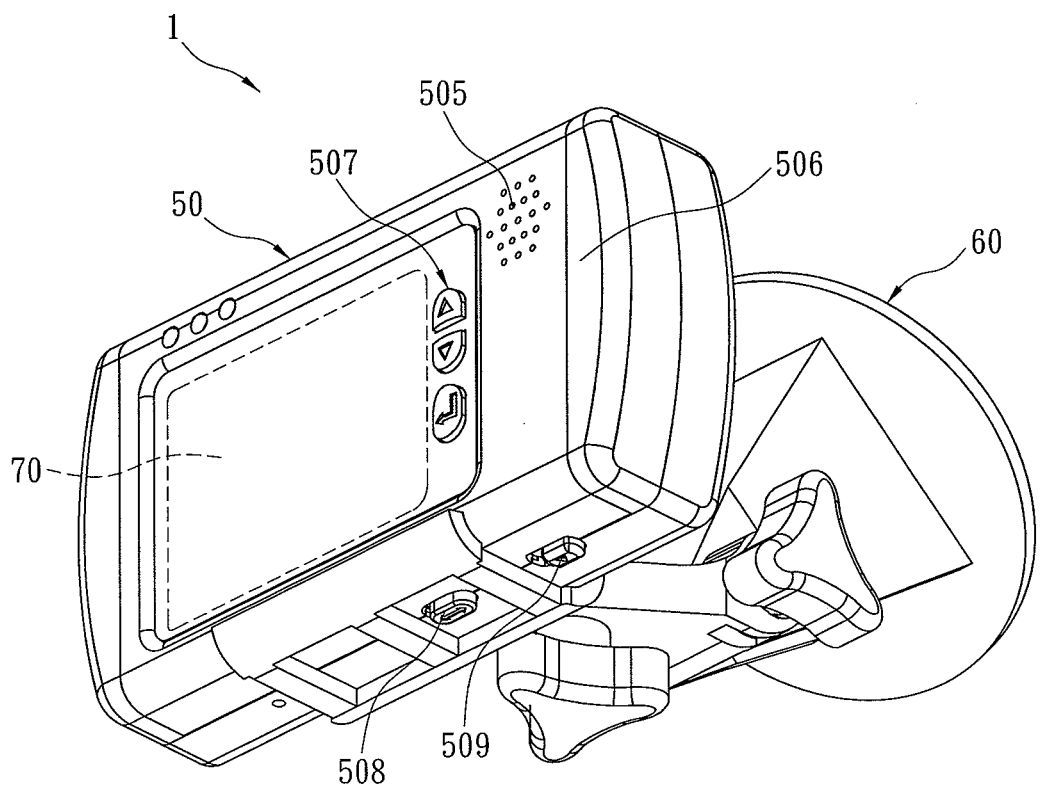
FIG. 5 is a perspective view of the embodiment in FIG. 4 from another angle of view.
Figure 6:
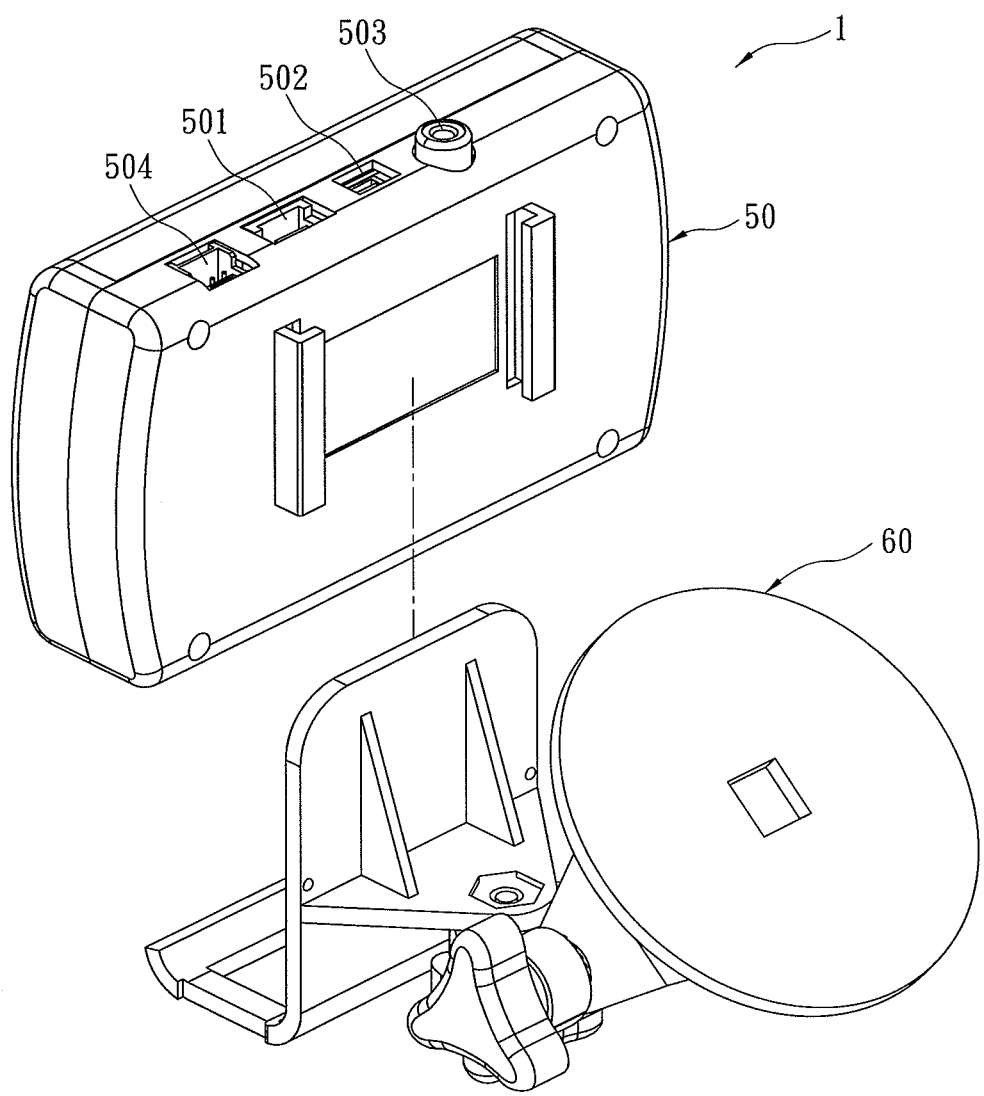
FIG. 6 a perspective view of the embodiment in FIG. 4 separated with the bracket.

Refer from FIG. 4 to FIG. 6, the LDWS 1 is an integrated part 50 that is able to be installed easily. For example, a bracket 60 with adjustable angle and direction is used to attach the LDWS 1 on a front screen or a speedometer.

Figure 3:
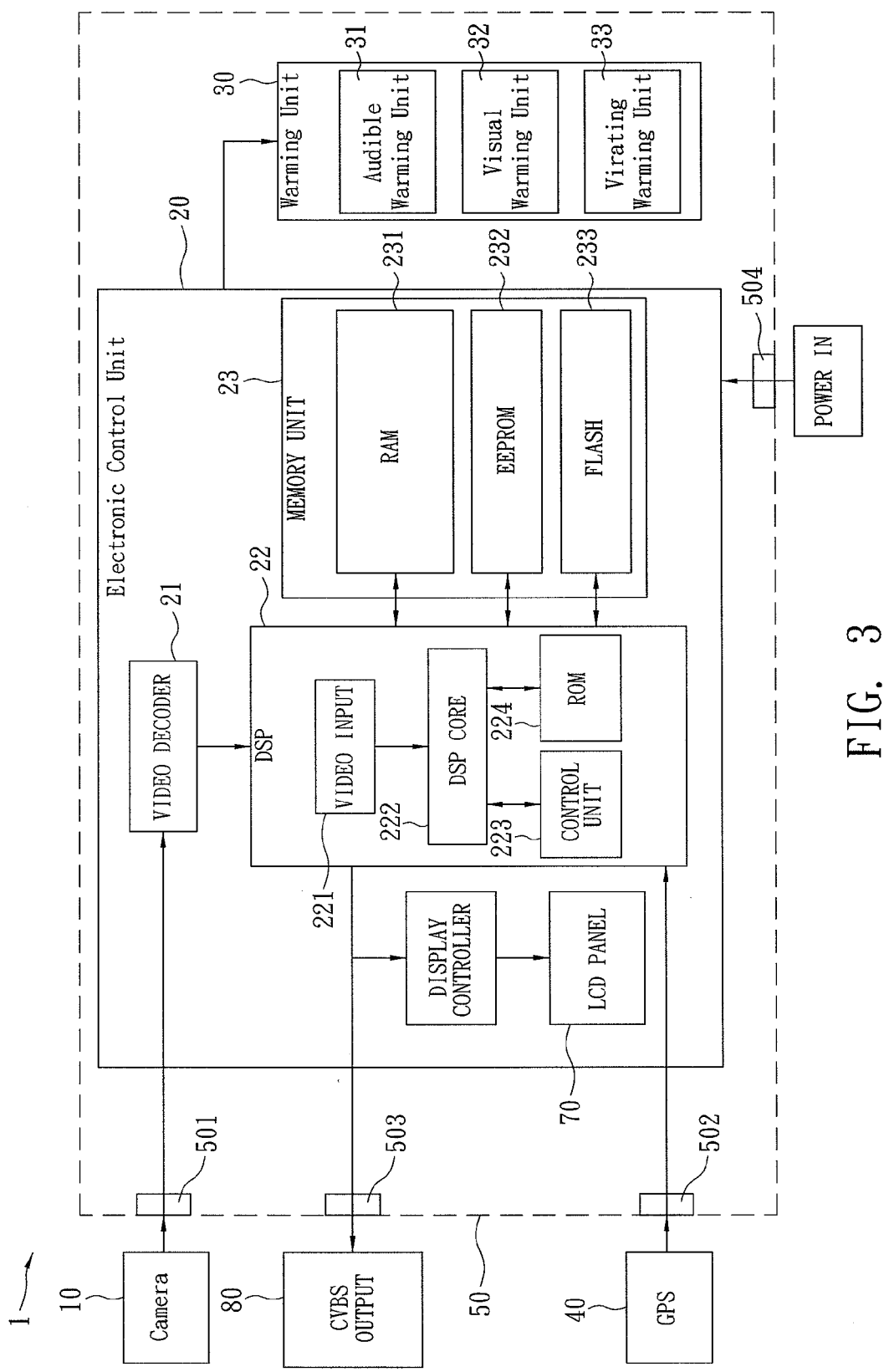
FIG. 3 is a circuit diagram of an embodiment

The camera 10 of the LDWS 1 is not limited to a certain type. It can be a CMOS (Complementary Metal-Oxide-Semiconductor) or a CCD (Charge Coupled Device). The assembling (connection) way between the camera 10 and the integrated part 50 of the LDWS 1 is not limited and is able to be modified according to requirements or convenience of manufacturing, assembling and installation. The camera 10 can be directly disposed on the integrated part 50 so as to integrate with the LDWS 1, as shown in FIG. 1. Or the camera 10 can be an independent part connecting with the integrated part 50 by wires 11, as shown in FIG. 3 & FIG. 4. For example, the integrated part 50 is disposed with a camera connection port 501 for the wire 11 of the camera 10 to plug in. The camera 10 can also be attached on the front screen (windshield glass).

The assembling (connection) way between the GPS 40 and the integrated part 50 of the LDWS 1 is not limited and is able to be modified according to requirements or convenience of manufacturing, assembling and installation. The GPS 40 can be directly arranged on the integrated part 50 so as to integrate with the LDWS 1, as shown in FIG. 1. Or the GPS 40 can be an independent part that connects with the integrated part 50 by a wire 41, as shown in FIG. 3 & FIG. 4. For example, the integrated part 50 is disposed with a GPS connection port 502 for the wire 41 of the GPS 40 to plug in. The GPS 40 can also be attached on the front screen (windshield glass) or the speedometer, facing the sky.

Figure 2:
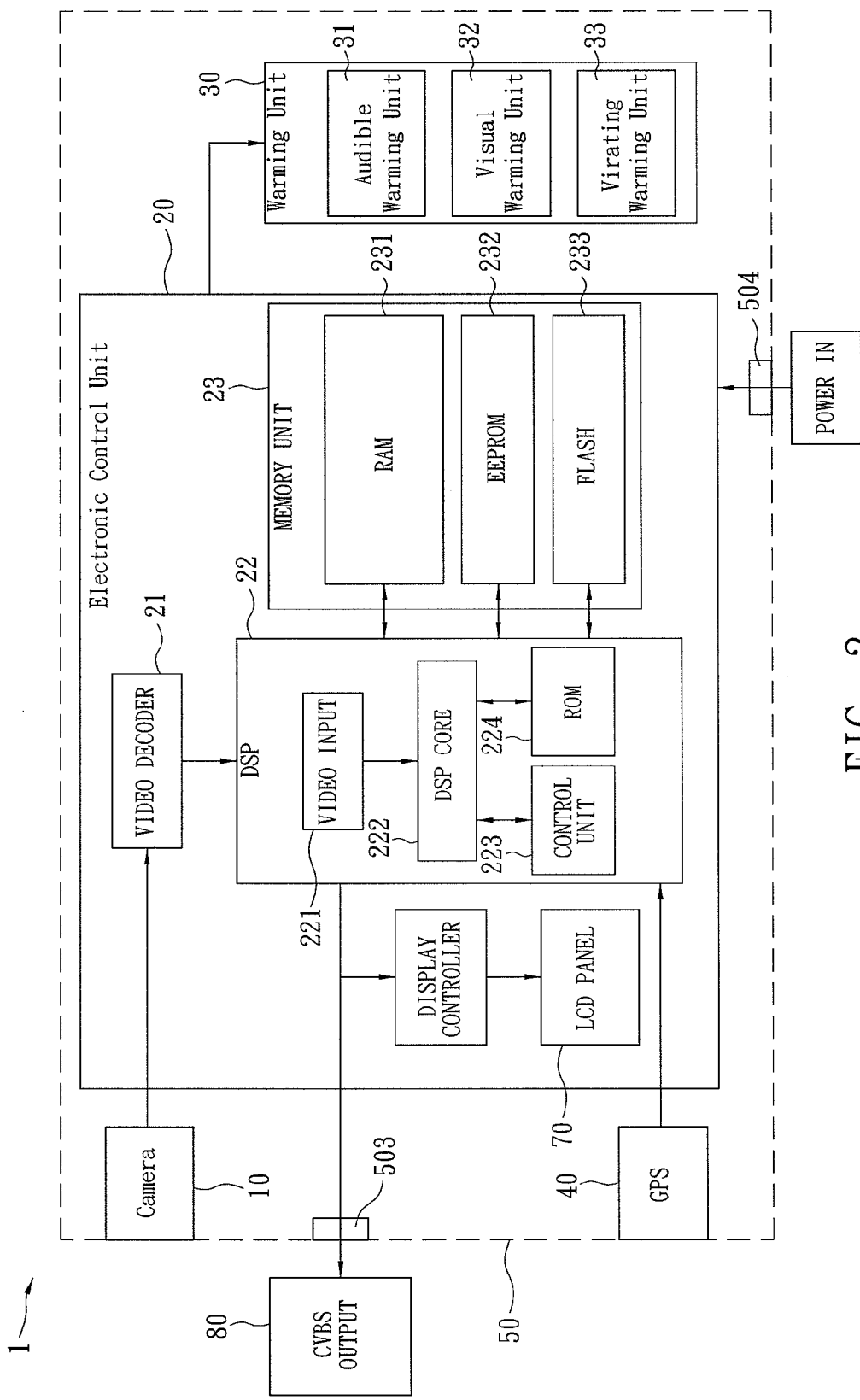
FIG. 2 is a circuit diagram of an embodiment with an independent DSP according to the present invention.

The DLWS 1 is further disposed with a display such as LCD panel 70, as shown from FIG. 1 to FIG. 3. The display such as LCD panel 70 is arranged on a rear side of the integrated part 50 of the LDWS 1, facing the vehicle interior space and displaying road images such as lines on two sides of vehicle lanes taken by the camera 10, as shown in FIG. 4 & FIG. 5. While being installed, the angle and the direction of the camera 10 can be adjusted by the display 70 so as to capture optimal road images for recognition and improve convenience of installation of the LDWS 1.

The LDWS 1 of the present invention further includes a CVBS output 80 that receives composite video broadcast signal (CVBS), as shown from FIG. 1 to FIG. 3. For example, a CVBS connection port 503 is disposed on the integrated part 50 of the LDWS 1 so as to connect with an external display 80 such as a large-size LCD panel or a projection display such as Head-Up-Display (HUD), as shown in FIG. 4 & FIG. 5. Thus users can see enlarged images or related data of road images captured by the camera 10 by the external display or HUD (not shown in figure).

Refer from FIG. 1 to FIG. 3, the ECU 20 of the LDWS 1 consists of a video decoder 21 such as model No. ADV7180, a digital signal processor (DSP) 22 and a memory unit 23 for image processing and recognition. The DSP 22 can be an integrated circuit (IC) as shown in FIG. 1. Refer to FIG. 2, the DSP 22 is formed by a plurality of IC such as a video input 221, a DSP core 222 such as model No. TMS320DM6437, a control unit 223 such as model No. PIC18F2520 and a Read-Only Memory (ROM) 224. The design of the DSP 22 can be modified in accordance with the users' requirements so as to improve the convenience of the LDWS 1 in manufacturing and assembling.

The memory unit 23 of the ECU 20 is a random access memory (RAM). Refer from FIG. 1 to FIG. 3, the memory unit (RAM) 23 can be a double-data-rate synchronous dynamic random access memory (DDR2SDRAM) 231 for increasing speed of image processing and recognition. Or the memory unit 23 further includes an electrically erasable programmable read-only memory (EEPROM) 232 and/or a Flash 233 also for increasing speed of image processing and recognition. The Flash 233 is able to replace the ROM 224 of the DSP 22. Thereby the convenience of manufacturing and assembling of the LDWS 1 is improved.

Figure 7:
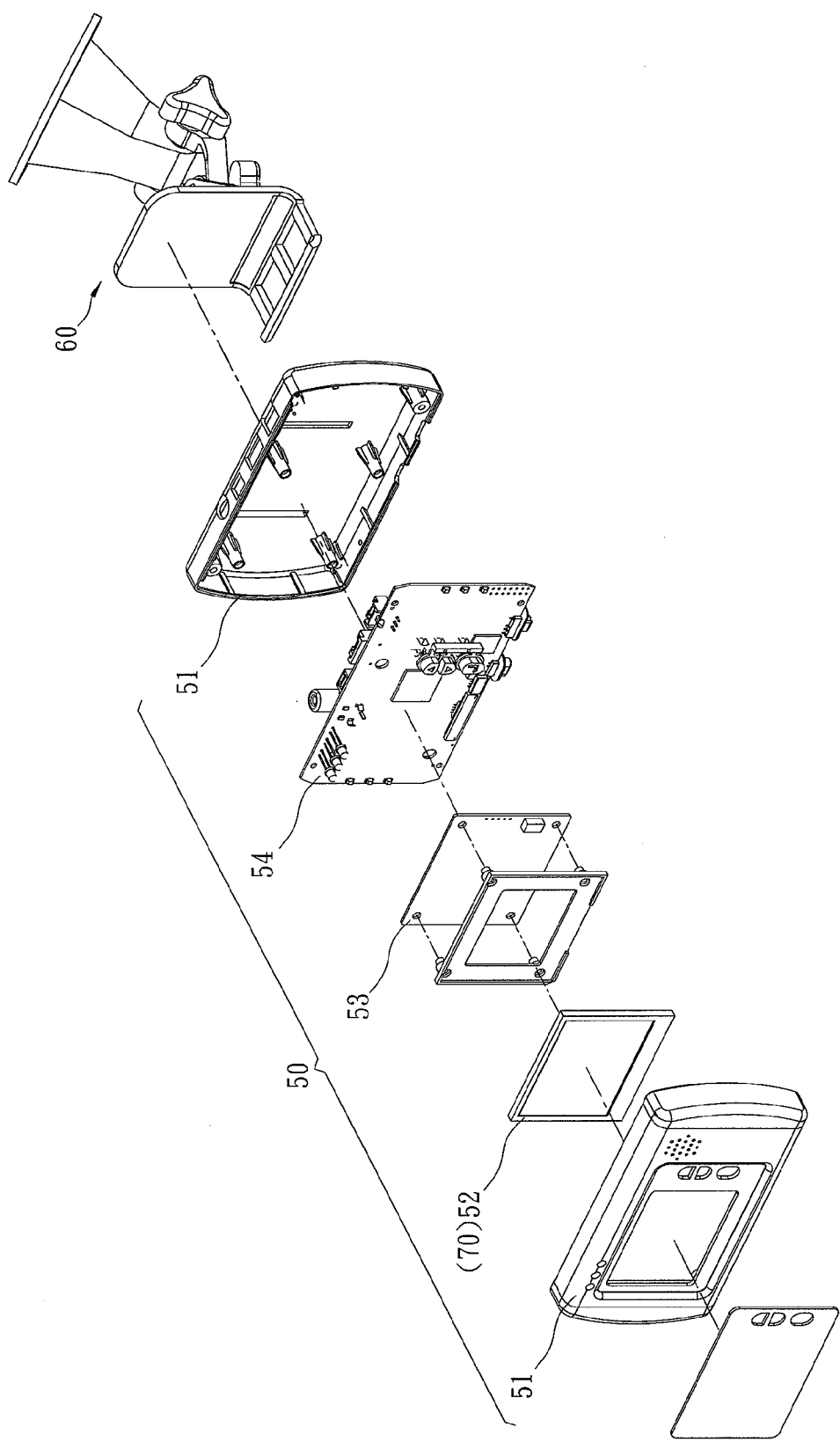
FIG. 7 is an explosive view of the embodiment in FIG. 4.

Refer from FIG. 4 to FIG. 7, the LDWS 1 is packed into an integrated part 50 that is used in combination with a bracket 60. As shown in FIG. 7, the integrated part 50 mainly includes a front and a rear covers 51, a LCD panel 52 (display 70), a LCD printed circuit board (LCD-PCB) 53 and a main printed circuit board (PCB) 54. The main PCB 44 includes all members of the ECU 20 of the present invention. Moreover, the covers 51 of the integrated part 50 are disposed with a camera connection port 501, a GPS connection port 502, a CVBS output connection port 503, a power connection port 504, a speaker port 505 (for displaying sounds from the audible warning unit 31), a LED waning light 506 (visual warning unit 32), functional keys 507, a ON/OFF button of the LCD panel 508 and a speaker sound level button 509 etc., as shown from FIG. 4 to FIG. 6. In accordance with above structure, the design of the LDWS 1 of the present invention favors manufacturing, assembling or installation of the LDWS 1 and the convenience of the LDWS 1 is improved.

In use, recognition parameters of the LDWS 1 of the present invention are set through users' end. The parameters include road images captured by the camera 10 such as a starting point, an end point and a sensitivity of lane departure of lane marking lines on highways. Moreover, the alarming function turned on at the vehicle speed of 60 Km/hr can also be preset. Furthermore, in order to make users to have more options while installing LDWS, the integrated part (member) 50 of the LDWS 1 is added with a vehicle signal connection port so as to connect with external devices when the users need.

The work flow of the LDWS 1 of the present invention includes the following steps: turn on the LDWS 1 first. Then the camera 10 tracks road images. The images are decoded through the LDWS 21 and the DSP 22 executes the brightness signal separation. Next recognize or check whether the lane marking lines are detected. If not (the answer is no), continue detection. If yes, check whether the vehicle starts to depart the lane. If not, the camera 10 keeps taking road images. If yes, the vehicle speed is obtained through the GPS 40 so as to check whether the vehicle speed lo is higher than the preset value such as 60 Km/hr for turning on the warning unit. If not, no alert will be sent. If yes, signals are sent to the warning unit 30 such as audible warning unit 31 and/or visual warning unit 32, and/or vibrating warning unit 33 so as to give a warning.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A system having a camera, a global positioning system (GPS) and a device with lane departure warning system (LDWS), the device being an integrated part of the LDWS installed in vehicles and comprising an internal electronic control unit (ECU) and at least a warning unit, wherein:

the device which is an integrated part of the LDWS has a cover with a camera connection port, a GPS connection port, a power connection port, a speaker port for providing sounds from an audible warning unit and at least one LED warning light of the warning unit;

the camera is connected with the device by a wire plugged into the camera connection port to track road images in front of a car and input the road images to the electronic control unit;

the electronic control unit having a video decoder, a digital signal processor (DSP) and a memory unit for processing and recognizing images;

the global positioning system (GPS) being connected with the device by at least one wire plugged into the GPS connection port;

wherein the electronic control unit is further connected with the global positioning system (GPS) so as to obtain vehicle speed signals of the car;

while in use, the road images are captured by the camera and are input to the electronic control unit (ECU) for being processed and recognized while the electronic control unit (ECU) gets the vehicle speed signals through the connected global positioning system (GPS) so as to check and give an alarm by sending signals to initiate the warning unit so as to warn the driver once the driver departs a lane without signaling, the camera and global positioning system being the only external devices operatively connected to the device with lane departure warning system (LDWS).

2. The system as claimed in claim 1, wherein the cover of the device has a display to show the road images captured by the camera.

3. The system as claimed in claim 1, wherein the cover of the device has a composite video broadcast signal (CVBS) connection port that is connected with an external display by at least one wire.

4. The system as claimed in claim 3, wherein the external display is a liquid crystal display panel or a Head-Up-Display (HUD) that projects images.

5. The system as claimed in claim 1, wherein the digital signal processor (DSP) is an integrated circuit (IC).

6. The system as claimed in claim 1, wherein the digital signal processor (DSP) includes a video input, a DSP core, a control unit and a Read-Only Memory (ROM).

7. The system as claimed in claim 1, wherein the memory unit is a double-data-rate synchronous dynamic random access memory (DDR2SDRAM).

8. The system as claimed in claim 7, wherein the memory unit further includes at least one of an electrically erasable programmable read-only memory (EEPROM) and a flash.

9. The system as claimed in claim 1, wherein the warning unit is an audible warning unit, a visual warning unit, a vibrating warning unit or combinations of them.

10. The system as claimed in claim 1, wherein the integrated part of the LDWS is further disposed on its cover with a power connection port, at least one functional key, a ON/OFF button of a LCD panel and a speaker sound level button.

11. The system as claimed in claim 1, wherein the electronic control unit (ECU) gets the vehicle speed signals through the connected global positioning system (GPS), the vehicle speed signal is set as equal to or above 60 Km/hr to turn on the warning unit for giving a driver a warning.

* * * * *